(12) United States Patent
Kim (10) Patent No.: US 7,777,849 B2
(45) Date of Patent: Aug. 17, 2010

(54) LIQUID CRYSTAL DISPLAY PANEL AND METHOD OF FABRICATING THE SAME

(75) Inventor: Dong Guk Kim, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 742 days.

(21) Appl. No.: 11/607,142

(22) Filed: Nov. 29, 2006

(65) Prior Publication Data

US 2007/0121045 A1    May 31, 2007

(30) Foreign Application Priority Data

Nov. 29, 2005    (KR) ................ 10-2005-0114987

(51) Int. Cl.
G02F 1/1337    (2006.01)
G02F 1/13    (2006.01)
(52) U.S. Cl. .................. 349/124; 349/129; 349/187
(58) Field of Classification Search ............... 349/124, 349/129, 187
See application file for complete search history.

(56) References Cited

U.S. PATENT DOCUMENTS 4,220,705 A * 9/1980 Sugibuchi et al. ............ 430/294
6,081,313 A * 6/2000 Kim ........................... 349/129

* cited by examiner

Primary Examiner—Uyen-Chau N Le
Assistant Examiner—John M Bedtelyon
(74) Attorney, Agent, or Firm—Brinks Hofer Gilson & Lione

(57) ABSTRACT

A liquid crystal display panel includes an upper alignment film and a lower alignment film positioned with liquid crystals therebetween to allow the liquid crystals to be aligned in a designated direction, and at least one of the upper and lower alignment film includes a first alignment film, and a second alignment film disposed on the first alignment film with holes for partially exposing the first alignment film. Liquid crystals in an area corresponding to the holes are aligned in a first direction by the first alignment film, and remaining liquid crystals are aligned in a second direction by the second alignment film.

8 Claims, 6 Drawing Sheets

< off - state >

FIG.2B
RELATED ART

< on – state >

LIQUID CRYSTAL DISPLAY PANEL AND METHOD OF FABRICATING THE SAME

This application claims the benefit of Korean Patent Application No. P2005-0114987 filed in Korea on Nov. 29, 2005, which is hereby incorporated by reference.

BACKGROUND

1. Technical Field

The present invention relates to a liquid crystal display panel, and more particularly to a liquid crystal display panel and a fabricating method thereof that are capable of increasing the response speed of a liquid crystal to improve display quality of the display panel.

2. Description of the Related Art

Generally, a liquid crystal display (hereinafter, referred to as "LCD") device controls the light transmittance of liquid crystal cells in response to a video signal to display a picture corresponding to the video signal on a liquid crystal display panel in which the liquid crystal cells are arranged in a matrix type.

Liquid crystal display devices are generally either classified as vertical electric field applying type devices or horizontal electric field applying type devices depending upon with a direction of an electric field that drives the liquid crystal.

Figure 1:
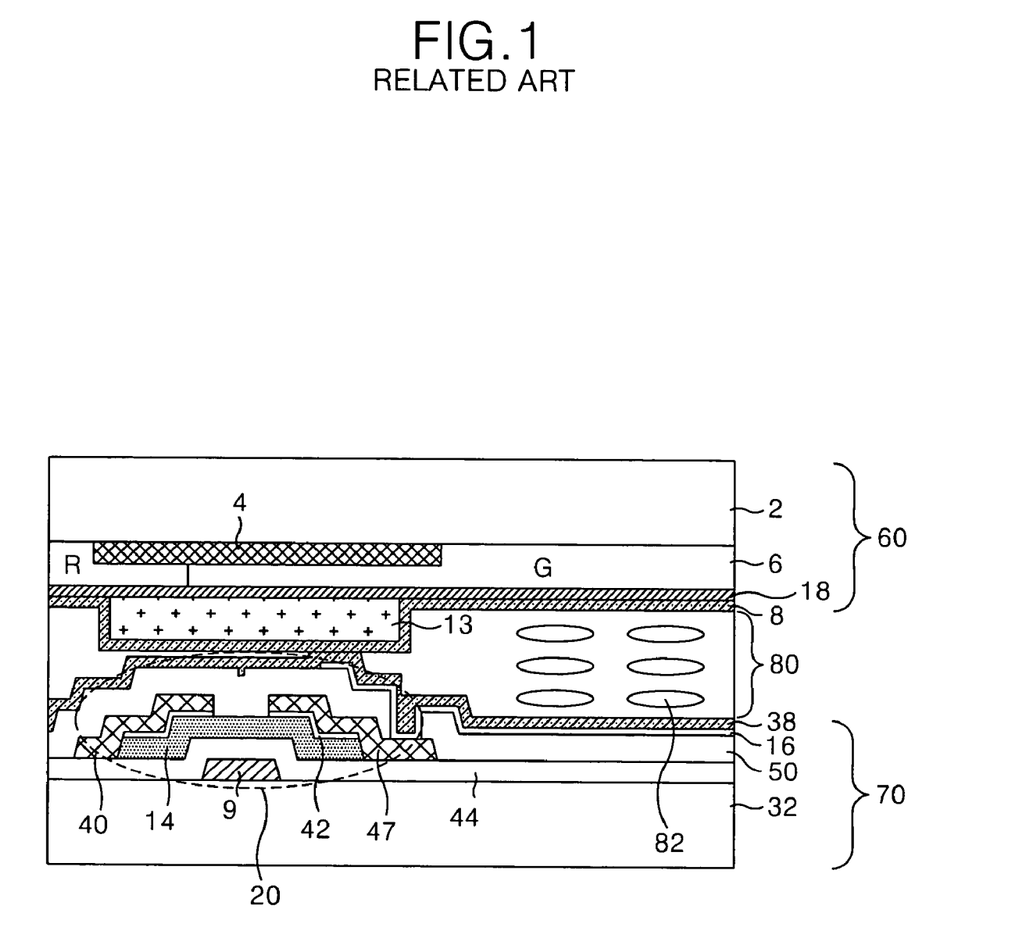
FIG. 1 is a sectional view showing a related art liquid crystal display panel.

The vertical electric field type of liquid crystal display device forms a pixel electrode and a common electrode arranged in opposition to each other on the upper and lower substrate, and applies an electric field in a vertical direction with the liquid crystal cell using a voltage applied to the electrodes. The vertical type liquid crystal display device normally has a large aperture ratio, although it normally has a narrow viewing angle. A representative liquid crystal mode of vertical electric field applying type display device shown in the sectional view of FIG. 1 is shown with a twisted nematic mode (hereinafter, referred to as "TN") provided at a liquid crystal display terminal.

The liquid crystal display panel includes an upper array substrate 60 (or a color filter array substrate) comprised of a black matrix 4, a color filter 6, a common electrode 18 and an upper alignment film 8 which are sequentially provided on an upper substrate 2. A thin film transistor 20 (hereinafter, referred to as "TFT") is provided on a lower substrate 32, a lower array substrate 70 (or a thin film transistor array substrate) that includes a pixel electrode 16 and a lower alignment film 38. Liquid crystals 82 are injected into an internal space between the upper array substrate 60 and the lower array substrate 70.

In the upper array substrate 60, the black matrix 4 corresponds to the TFT 20 area of a lower plate, gate line and data line areas are formed on the upper substrate 2, and define a cell area to be provided the color filter 6. The black matrix 4 prevents light leakage and absorbs an external light to improve a contrast ratio. The color filter 6 is formed at a cell area divided by the black matrix 4. The color filter 6 is provided for each R, G and B (corresponding to red, green, and blue, respectively) to provide the red, green, and blue colors on the display. The common electrode 18 is formed at a front side of the upper substrate 2 and is supplied with a common voltage that serves as a reference voltage for driving the liquid crystal. A spacer 13 maintains a cell gap between the upper array substrate 60 and the lower array substrate 70.

In the lower array substrate 70, the TFT includes a gate electrode 9 provided on the lower substrate 2 along with a gate line, semiconductor layers 14 and 47 overlap the gate electrode 9 with a gate insulating film 44 therebetween. Source/drain electrodes 40, 42 are formed along with a data line (not shown) with having the semiconductor layers 14 and 47 therebetween. Such a thin film transistor supplies a pixel signal from the data line to the pixel electrode 16 in response to a scanning signal from the gate line.

The pixel electrode 16 is a transparent conductive material having a high light transmittance and contacts the drain electrode 42 of the TFT 20 with a protective film 50 therebetween. An alignment material, such as a polyimide, is coated and then a rubbing process is carried out to provide an upper/lower alignment film 8, 38 for aligning of the liquid crystal.

Hereinafter, an operation of the TN mode on the occasion of a normally white mode will be described with reference to FIGS. 2A and 2B. An upper polarizer 72 with a light transmission axis oriented in a specific direction is attached at a light emitting surface of the upper array substrate 60, and a lower polarizer 62 having a light transmission axis perpendicular to the light transmission axis of the upper polarizer 72 is attached on a light incidence surface of the lower array substrate 70.

Figure 2A:
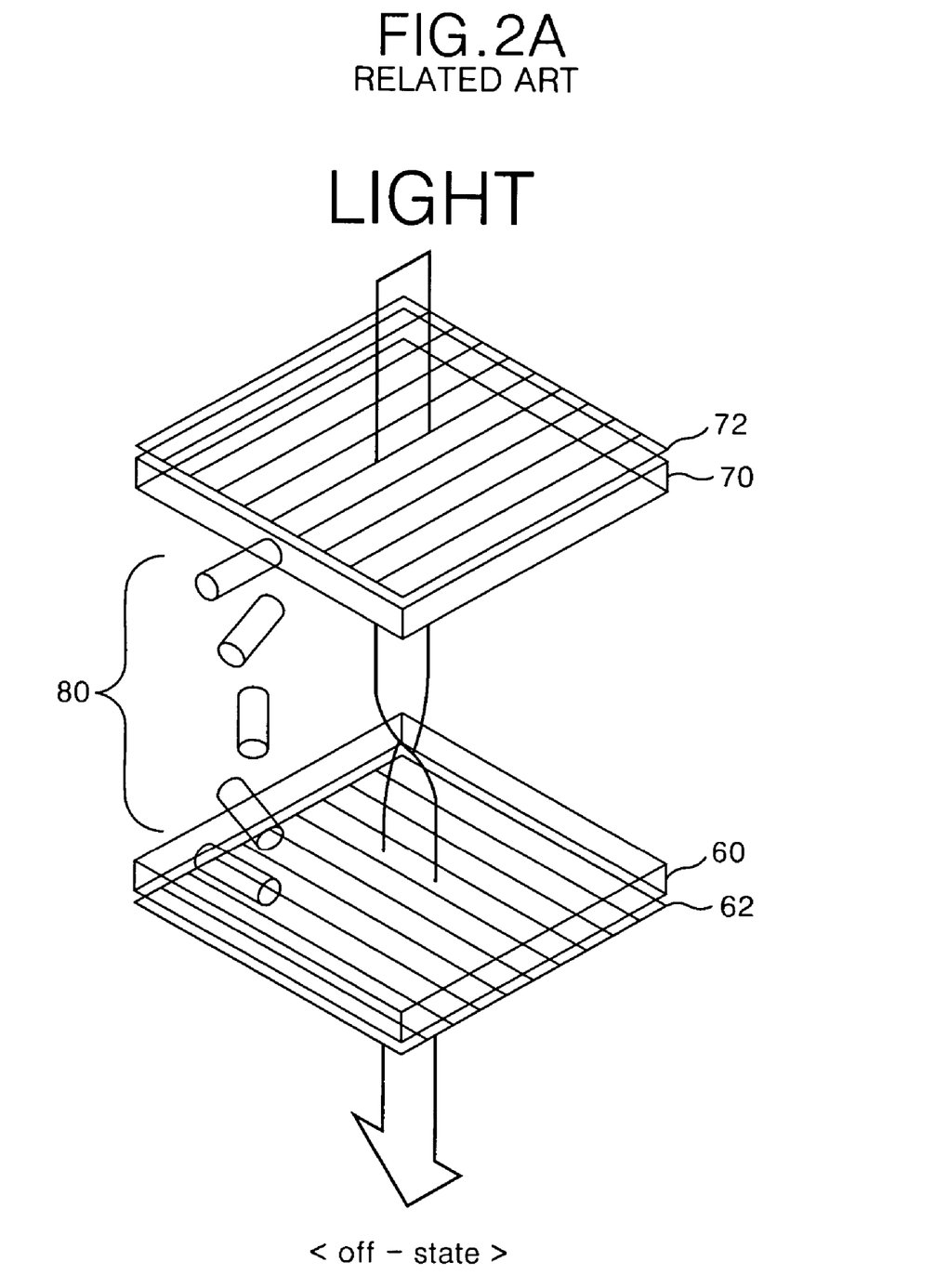
FIG. 2A and FIG. 2B are mimetic diagrams showing an operation of a liquid crystal display panel of a twisted nematic TN mode.
Figure 2B:
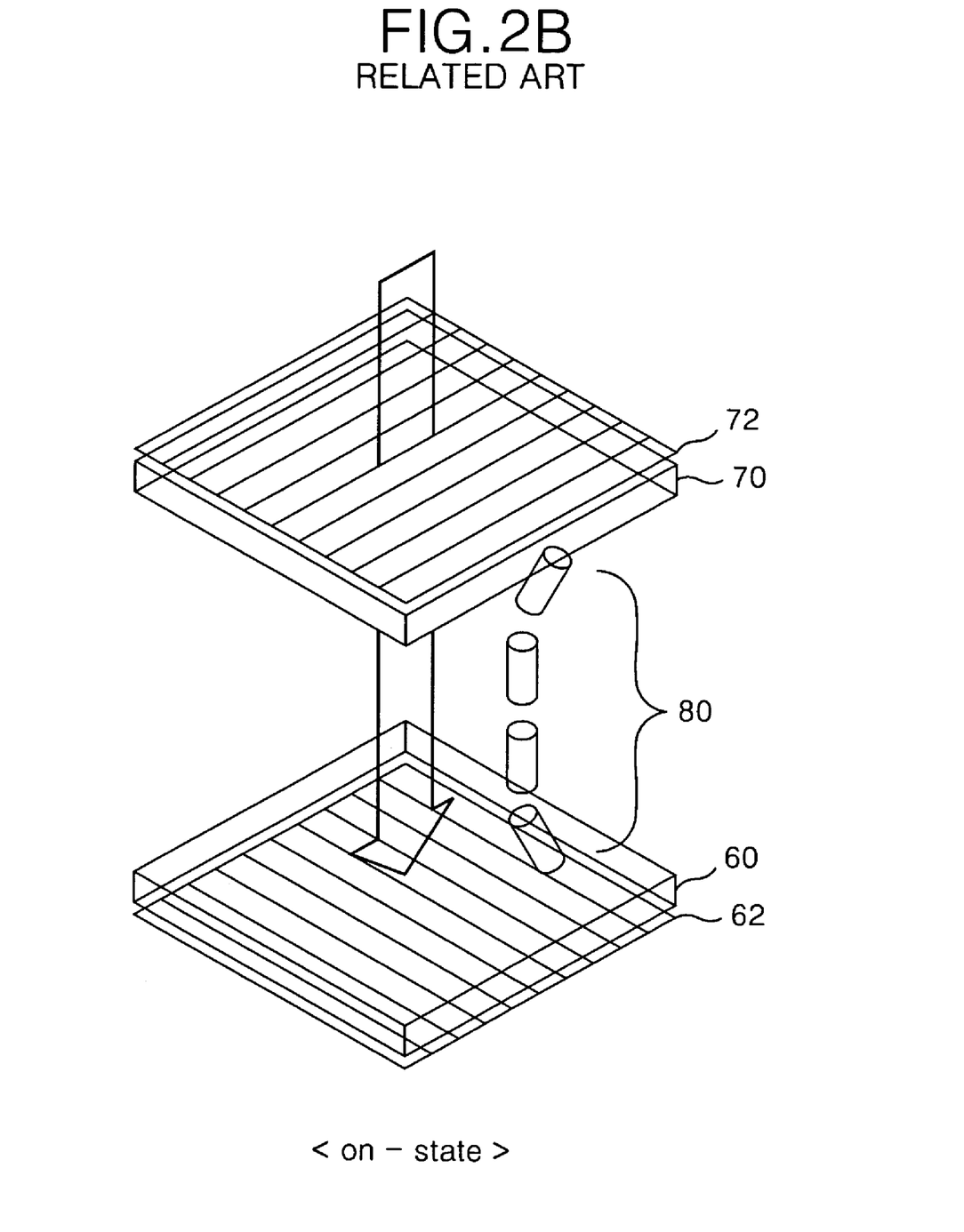

Referring specifically to FIG. 2A, a local optical axis (a director) of the liquid crystal 82 molecules is continuously twisted in such a manner to have a value of 90° between the upper array substrate 60 and the lower array substrate 70 on an off-state that a voltage is not applied to the upper array substrate 60 and the lower array substrate 70. The characteristics of a linearly polarized light passing through the lower polarizer 72 are modified to pass through the upper polarizer 62 at the off-state. Referring to FIG. 2B, in the TN mode an optical axis of a middle portion of a liquid crystal layer 80 is in parallel to the electric field at an on-state, where voltage is applied to the common electrode 18 and the pixel electrode 16 and the electric field is applied to the liquid crystal layer 80 by a voltage difference thereof to disentangle a twisted structure of the liquid crystal layer 80. A polarized incident light passing through the lower polarizer 72 additionally passes through the liquid crystal layer 80 at the on-state to maintain the polarized light characteristics as it is. The polarized light does not pass through the upper polarizer 62.

On the other hand, in the TN mode having the above-mentioned operation characteristics, a major axis of the liquid crystals 82 are arranged in a horizontal direction on the upper and lower alignment film 8 and 38 at the off-state, so that a pretilt angle is less than 5°. Accordingly, since the pretilt angle is so low at the off-state, then a speed that an optical axis of the liquid crystal 82 molecules are entirely in parallel to the electric field at the on-state, that is, a response speed, is slowed down. Although an initial alignment generally has a high pretilt angle with a vertical alignment film, a time that the liquid crystal 82 aligned in a vertical direction is arranged in a horizontal direction, is also slowed down. Upon implementing an image, a residual image is generated on the screen by a response speed delay of such a liquid crystal, so that a display quality is reduced.

SUMMARY OF THE INVENTION

A liquid crystal display panel includes an upper alignment film and a lower alignment film positioned with liquid crystals therebetween to allow the liquid crystals to be aligned in a designated direction. At least one of the upper and lower alignment film comprises a first alignment film. A second alignment film is disposed on the first alignment film and has holes for partially exposing the first alignment film. The liquid crystals of an area corresponding to the hole are aligned in a first direction by the first alignment film, and liquid crystals of an area corresponding to an area other than the hole are aligned in a second direction by the second alignment film.

A method is disclosed for fabricating a liquid crystal display panel that includes an upper alignment film and a lower alignment film having liquid crystals therebetween. At least one of the upper and lower alignment film is formed by the steps of forming a first alignment film for aligning the liquid crystal in a first direction, and forming a second alignment film disposed on the first alignment film. Holes are provided for partially exposing the first alignment film and for aligning liquid crystals of an area corresponding to an area other than the hole in a second direction.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3:
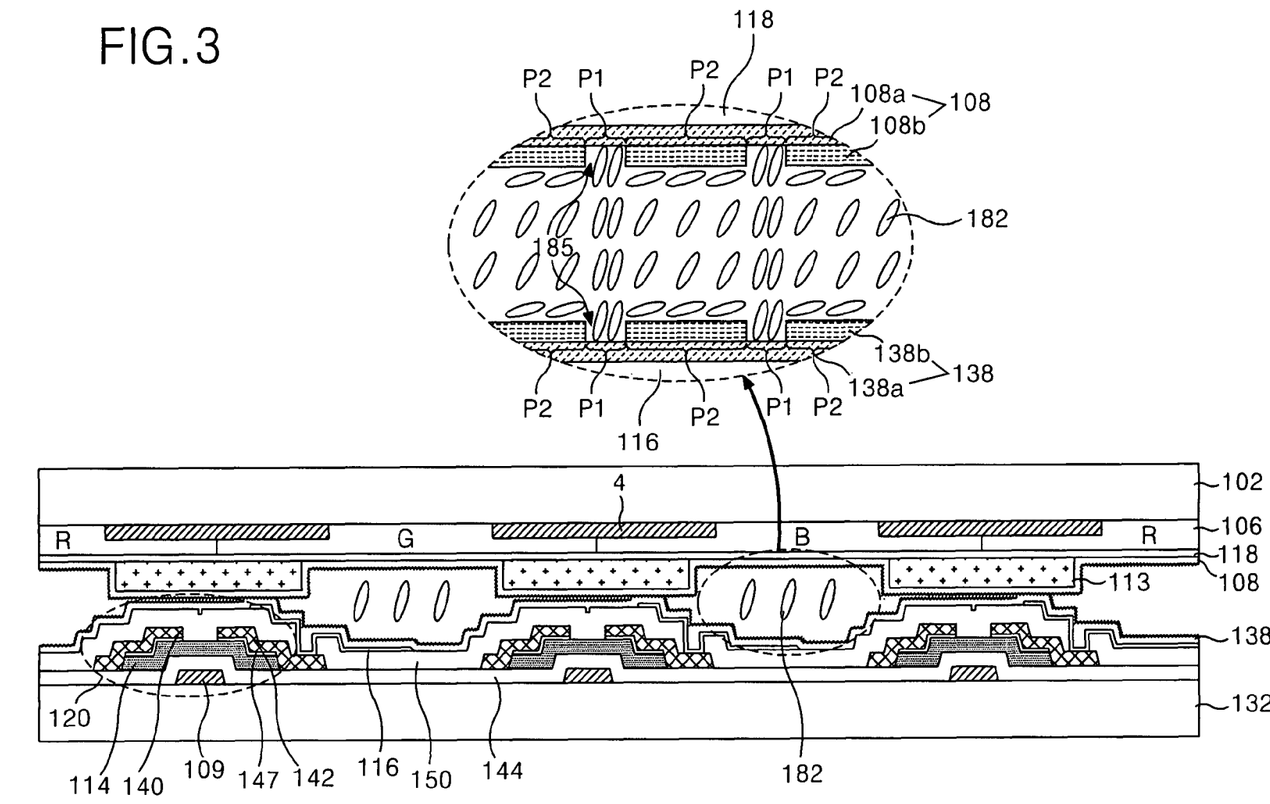
FIG. 3 is a sectional view showing a liquid crystal display panel according to an embodiment of the present invention.
Figure 4:
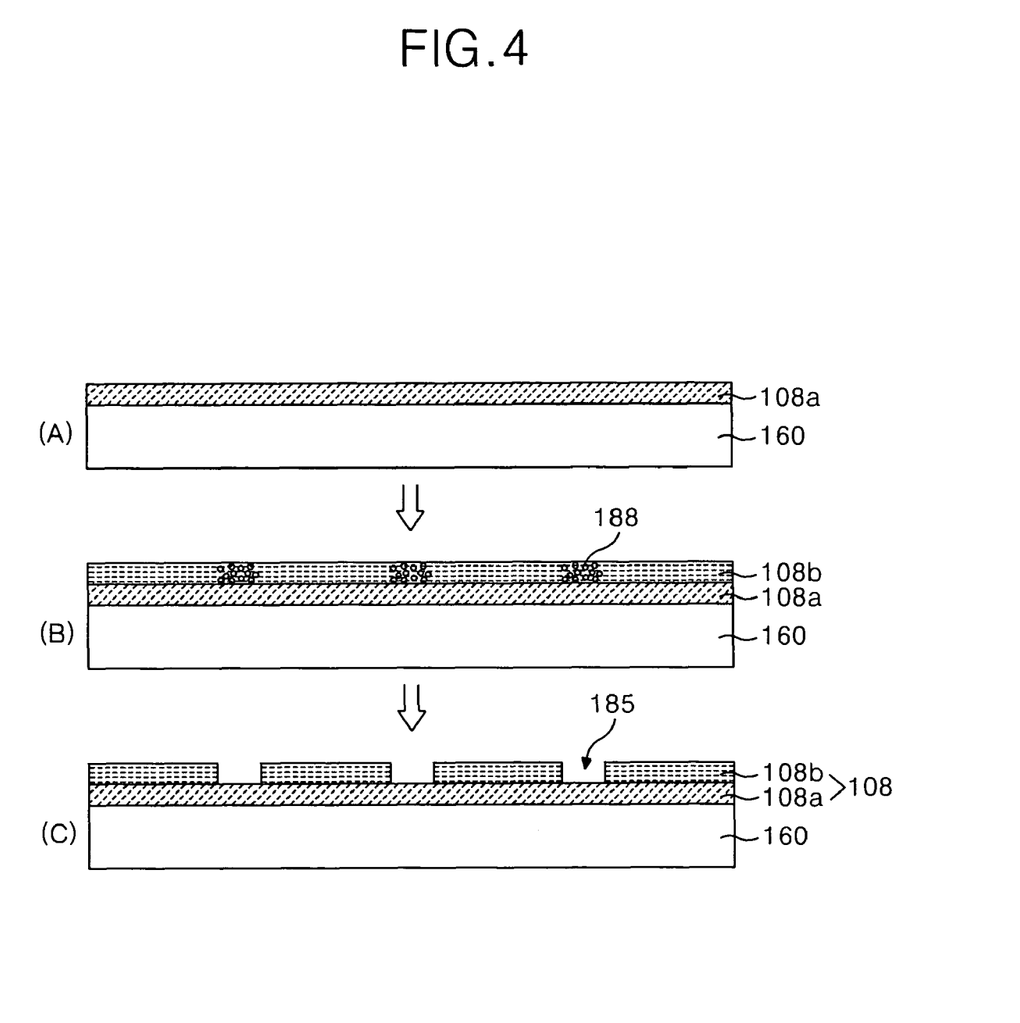
FIG. 4 is a diagram showing a manufacturing process of an upper and lower alignment film of the present invention step by step.
Figure 5:
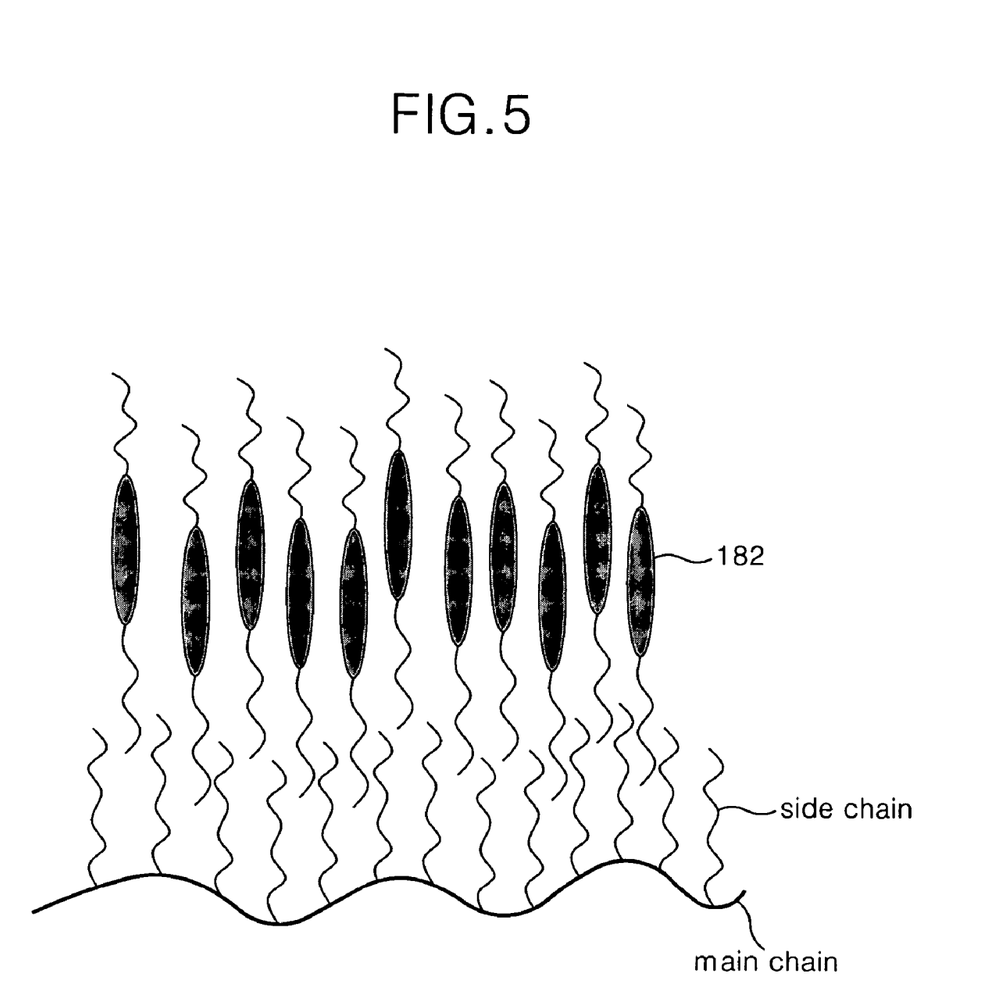
FIG. 5 is a mimetic diagram showing a liquid crystal arrangement shape by a vertical alignment film.

Turning now to the embodiments presented in FIGS. 3-5, the liquid crystal display panel includes an upper array substrate 160 (or a color filter array substrate) including a black matrix 104, a color filter 106, a common electrode 118, and an upper alignment film 108 which each are sequentially provided on an upper substrate 102, a thin film transistor 120 provided on a lower substrate 132, a lower array substrate 170 (or a thin film transistor array substrate) comprised of a pixel electrode 116 and a lower alignment film 138, and liquid crystals 182 injected into an internal space between the upper array substrate 160 and the lower array substrate 170.

In the upper array substrate 160, the black matrix 104 corresponds to the thin film transistor 120 area of a lower plate, gate lines and data lines are arranged on the upper substrate 102, and defines a cell area to be provided the color filter 106. The black matrix 104 prevents light leakage and absorbs an external light to improve a contrast ratio of the panel. The color filter 106 is formed in the area of the cell and divided by the black matrix 104 and additionally at the black matrix 104. The color filter 106 is provided for each R, G and B to implement red, green, and blue colors, respectively. The common electrode 118 is formed at a front side of the upper substrate 102 and is supplied with a common voltage that serves as a reference voltage for driving the liquid crystal. A spacer 113 maintains a cell gap between the upper array substrate 160 and the lower array substrate 170.

In the lower array substrate 170, the thin film transistor includes a gate electrode 109 provided on the lower substrate 102 along with a gate line, semiconductor layers 114 and 147 overlapped with the gate electrode 109, with a gate insulating film 144 therebetween, source/drain electrodes 140, 142 formed along with a data line (not shown) with semiconductor layers 114, 147 therebetween. Such a thin film transistor supplies a pixel signal from the data line to the pixel electrode 116 in response to a scanning signal from the gate line.

The pixel electrode 116 is a transparent conductive material with a high light transmittance and contacts the drain electrode 142 of the thin film transistor 120. A protective film 150 is provided between the pixel electrode 116 and the thin film transistor 120.

Each of an upper/lower alignment films 108, 138 aid in the alignment of the liquid crystal include double-layer of vertical alignment films 108a, 138a for aligning the liquid crystal 182 in a vertical direction and horizontal alignment films 108b, 138b for aligning the liquid crystal 182 in a horizontal direction. Holes 185 for partially exposing the vertical alignment films 108a, 138a are provided on the horizontal alignment films 108b, 138b. Accordingly, some liquid crystals 182 corresponding to the vertical alignment films 108a, 138a are arranged in a substantially vertical direction and other liquid crystals 182 corresponding to the horizontal alignment films 108b, 138b are arranged in a substantially horizontal direction to thereby widen an average pretilt angle of whole liquid crystals 182 in comparison to the related art. As a result, a high-speed response of the liquid crystal is possible, so that a display quality can be improved.

An aspect of the present invention provides that the liquid crystals 182 at a pretilt angle of between approximately 30 degrees and approximately 60 degrees to thereby reduce a flow angle of a liquid crystal molecules in order to improve the liquid crystal response speed delay that is in evidence when a pretilt angle of the liquid crystals 182 is a very low or very high.

Accordingly, each of the upper/lower alignment films 108, 138 include a double-layer of the vertical alignment films 108a, 138a and the horizontal alignment films 108b, 138b, and a plurality of holes 185 are provided for partially exposing the vertical alignment films 108a, 138a on the horizontal alignment films 108b, 138b.

The upper/lower alignment films 108, 138 are divided into a first area P1 corresponding to the holes 185 and a second area P2 away from the holes 185. In this case, the liquid crystals 182 corresponding to the second area P2 are generally horizontal-aligned by the horizontal alignment films 108b, 138b, and the liquid crystals 182 corresponding to the first area P1 are generally vertical-aligned by the vertical alignment films 108a, 138a.

As a result, the liquid crystals 182 within the liquid crystal layer 180 have an average pretilt angle of between approximately 30 degrees and approximately 60 degrees, which reduces the floating angle distance so that the liquid crystal 182 molecules are arranged in parallel to the electric field or are arranged in a vertical direction with respect to the electric field at the on-state. Thus, a high-speed driving of the liquid crystal is possible, so that a display quality can be improved.

FIG. 4 is a diagram showing the steps used in the manufacturing process of the upper and lower alignment films 108, 138 with the double-layer structure shown in FIG. 3. The upper and lower alignment films 108, 138 are manufactured by the same system. For the sake of brevity, only a process of forming the upper alignment film 108 will be described, but one of ordinary skill in the art should understand that the process for forming the lower alignment film 138 is representative of the process discussed below.

Initially, a monomer of a dianhydride-group and a monomer of a diamine-group are polymerization-reacted with a solvent such as NMP (N-Methyl Pyrrolidone), etc., to thereby provide a liquid polyimide, or similar solvents with similar chemical properties to NMP may be used. The liquid polyimide is coated on a designated substrate. The liquid polyimide is formed on the common electrode 118 in a process for forming the upper array substrate 160 by a printing or a spin-coating method. Next, the firing process is carried out to thereby provide the vertical alignment film 108a shown in FIG. 4(A). Herein, a molecule structure of the polyimide is divided into a main chain and a side chain. If a material that has a long hydrocarbon CH among the monomer of the diamine-group is used, then a length of the side chain and if a separate rubbing process is not carried out, then the liquid crystal 182 is in parallel to the side chain to be aligned the liquid crystal 182 in a vertical direction shown in FIG. 5. On the other hand, the vertical alignment film 108a of the present invention can be formed by any other method other than the above-mentioned method of forming the vertical alignment film 108a.

The monomer of the dianhydride-group and the monomer of the diamine-group, other than a material having a long hydrocarbon CH, are polymerized by using a solvent such as NMP (N-Methyl Pyrrolidone), etc., and the liquid polyimide including the poly vinyl cinnamate compound 188 (hereinafter, referred to as "PVCI") is coated on the vertical alignment film 108a by the printing or the spin-coating method.

Next, the rubbing process and the firing process are carried out to thereby provide the horizontal alignment film 108b. Herein, the PVCI molecules 188 are condensed each other within the polyimide shown in FIG. 4(B). The horizontal alignment film 108b is cleaned with a cleaning solution that selectively reacts with the PVCI molecules 188. Accordingly, the PVCI within the horizontal alignment film 108b is removed with the cleaning solution to thereby provide a plurality of holes 185 for exposing the vertical alignment film 108b shown in FIG. 4(C). The cleaning solution may include any at least one of monochlorobenzene or dichloroethane solution, or another compound that is capable of reacting with PVCI 188.

A method of fabricating a liquid crystal display panel having the above-mentioned upper/lower alignment film will be schematically described. A lower alignment film 138 that includes the vertical alignment film 138a and the horizontal alignment film 138b is formed using the method shown in FIG. 4 on the lower array substrate 170 and provided with thin film patterns such as the thin film transistor 120, the gate insulating film 144, the protective film 150, and the pixel electrode 116.

An upper alignment film 108 comprised of the vertical alignment film 108a and the horizontal alignment film 108b is formed using the method shown in FIG. 4 on the upper array substrate 160 and provided with thin film patterns such as the black matrix 104, the color filter 106 and the common electrode 118.

Next, the upper array substrate 160 and the lower array substrate 170 are joined together to provide a liquid crystal display panel. The liquid crystal 182 may be injected before the upper array substrate 160 and the lower array substrate 170 are joined with each other. Alternatively, the liquid crystal 182 may be injected after the upper array substrate 160 and the lower array substrate 170 are joined with each other.

The liquid crystals 182 of the liquid crystal display panel are arranged in a substantially horizontal direction at an area corresponding to the horizontal alignment films 108b, 138b of the respective upper and lower alignment film 108, 138. The liquid crystals 182 are additionally arranged in a vertical direction at an area corresponding to or in the vicinity of the vertical alignment films 108a, 138a of the respective upper and lower alignment films 108, 138 that are exposed by the holes 185. As a result, an average pretilt angle of the whole liquid crystals 182 can be maintained in between approximately 30 degrees and approximately 60 degrees.

As described above, a pretilt angle of the liquid crystal is optimized by using the vertical and horizontal alignment film to thereby easily be applied with a technique for improving a response speed of the liquid crystal to a liquid crystal display panel of the TN mode, ECB (Electrical Controlled Birefringence) and a liquid crystal display panel of a VA (Vertical Alignment).

As described above, the liquid crystal display panel and the fabricating method thereof according to the present invention comprise each of the upper/lower alignment film of a double-layer of the vertical alignment film and the horizontal alignment film, and form a plurality of holes for partially exposing the vertical alignment film at the horizontal alignment film. Accordingly, some liquid crystals corresponding to the vertical alignment film are arranged in a vertical direction and other liquid crystals corresponding to the horizontal alignment film are arranged in a horizontal direction to thereby maintain an average pretilt angle of whole liquid crystals between approximately 30 degrees and approximately 60 degrees. As a result, a high-speed response of the liquid crystal is possible, so that a display quality can be improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display panel including an upper alignment film and a lower alignment film provided with liquid crystals therebetween, wherein at least one of the upper or lower alignment film is formed by the steps comprising:

forming a first alignment film;

forming a second alignment film with a plurality of holes on the first alignment film, the holes partially exposing the first alignment film; and wherein the liquid crystals of an area corresponding to the plurality of holes are aligned in a first direction, and the liquid crystals disposed over the second alignment film are aligned in a second direction, and wherein forming the second alignment film comprises:

coating a polyimide including a poly vinyl cinnamate compound on the first alignment film;

condensing the poly vinyl cinnamate compound molecules to each other within the polyimide; and removing the condensed poly vinyl cinnamate compound molecules within the polyimide using dichloroethane solution to define the holes for partially exposing the first alignment film.

2. The method of fabricating the liquid crystal display panel of claim 1, wherein the first direction is a substantially vertical direction and the second direction is a substantially horizontal direction.

3. The method of fabricating the liquid crystal display panel of claim 1, wherein the first direction is a substantially horizontal direction and the second direction is a substantially vertical direction.

4. The method of fabricating the liquid crystal display panel of claim 1, wherein the first alignment film is a vertical alignment film for aligning the liquid crystals in a vertical direction and the second alignment film is a horizontal alignment film for aligning the liquid crystals in a substantially horizontal direction.

5. The method of fabricating the liquid crystal display panel of claim 1, wherein the first alignment film is a horizontal alignment film for aligning the liquid crystals in a substantially horizontal direction and the second alignment film is a vertical alignment film for aligning the liquid crystals in a vertical direction.

6. The method of fabricating the liquid crystal display panel of claim 1, wherein forming the second alignment film comprises:
   curing the polyimide; and
   rubbing the polyimide.

7. The method of fabricating the liquid crystal display panel of claim 1, wherein an average pretilt angle of the liquid crystals is between about 30 degrees and about 60 degrees.

8. The method of fabricating the liquid crystal display panel of claim 1, wherein the liquid crystals are reoriented by a vertical electric field between a common electrode positioned at a lower portion of the upper alignment film and pixel electrodes positioned at a lower portion of the lower alignment film.

* * * * *